United States Patent
Lassen et al.

(10) Patent No.: US 9,590,852 B2
(45) Date of Patent: Mar. 7, 2017

(54) SERVER MAINTENANCE SYSTEM

(71) Applicant: Facebook, Inc., Menlo Park, CA (US)

(72) Inventors: Soren Bogh Lassen, San Francisco, CA (US); Guanghao Shen, Menlo Park, CA (US); Iain Becker, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 194 days.

(21) Appl. No.: 13/769,088

(22) Filed: Feb. 15, 2013

(65) Prior Publication Data

US 2014/0237090 A1    Aug. 21, 2014

(51) Int. Cl.
H04L 12/24    (2006.01)

(52) U.S. Cl.
CPC ........ H04L 41/082 (2013.01); H04L 41/0836 (2013.01)

(58) Field of Classification Search
CPC ................................ H04L 67/28; H04L 67/34
USPC ......................................................... 709/223
See application file for complete search history.

(56) References Cited

U.S. PATENT DOCUMENTS

| | | | |
|---|---|---|---|
| 6,292,905 B1 * | 9/2001 | Wallach et al. | 714/4.12 |
| 6,571,354 B1 * | 5/2003 | Parks et al. | 714/6.32 |
| 6,751,794 B1 * | 6/2004 | McCaleb | G06F 8/65 707/999.202 |
| 7,685,463 B1 * | 3/2010 | Linnell | 714/5.1 |
| 7,702,614 B1 * | 4/2010 | Shah et al. | 707/741 |
| 7,725,768 B1 * | 5/2010 | Bezbaruah et al. | 714/15 |
| 2003/0135536 A1 * | 7/2003 | Lyons | G06F 8/67 718/103 |
| 2004/0243699 A1 * | 12/2004 | Koclanes et al. | 709/224 |
| 2006/0053337 A1 * | 3/2006 | Pomaranski et al. | 714/4 |
| 2009/0100419 A1 * | 4/2009 | Childress | G06F 8/65 717/171 |
| 2009/0240791 A1 * | 9/2009 | Sakurai et al. | 709/221 |
| 2011/0320591 A1 * | 12/2011 | Ozaki | 709/224 |

FOREIGN PATENT DOCUMENTS

| | | | |
|---|---|---|---|
| JP | 2006323485 A | * | 11/2006 |
| JP | 2011-142568 A | * | 7/2011 |

* cited by examiner

*Primary Examiner* — Tonia L Dollinger
*Assistant Examiner* — Albert Chiou
(74) *Attorney, Agent, or Firm* — Perkins Coie LLP

(57) ABSTRACT

A method includes: determining a maintenance update for a data service tier based on a service condition of a data service of a target host server; selecting a spare host server to perform the maintenance update; performing the maintenance update of the data service tier to the spare host server; activating the data service on the spare host server; and redirecting client request traffic to the spare host server.

19 Claims, 8 Drawing Sheets

SERVER MAINTENANCE SYSTEM

FIELD OF INVENTION

This invention relates generally to a server maintenance system, and in particular to a server maintenance system with an update scheduling mechanism.

BACKGROUND

Data access is an important aspect of many website. Data services to a repository of data content or content link can be provided by index servers of a website distributed in various physical locations. Each repository of a type of content or a group of content can be divided into service tiers of index servers. However, data centers everywhere are faced with physical and logical challenges in properly updating these index servers.

The data services depend on up-to-date index data structures, such as index tables. Traditionally, updates to a service tier involve redirecting traffic from one replica of the service tier in one geographical region to another replica of the service tier in another region. This process results in halting of the data service in at least one geographical region. For a website serving a large traffic volume, any halting of the data service of any service tier can slow down the viewers' access to the website. Further, redirection of traffic from one replica of the service tier to another can be fairly labor intensive to schedule and monitor.

SUMMARY

Disclosed herein is a maintenance system configured to update a service tier of index servers without needing to bring down the service tier, or redirecting traffic from the service tier. The service tier is a collection of one or more host servers for providing a specific operational function, such as serving one set of index. The techniques introduced here enable piece-meal updates to the index data structure without halting the service tier. Embodiments of this disclosure include one or more spare host servers to accomplish the piece-meal updates.

Each update cycle, a maintenance system can determine a priority of how important it is for a target host server to be replaced by a spare host server. The priority is calculated based on an age of the index data structure on the target host server, an age of a service executable on the target host server, bandwidth capacity of the target host server, bandwidth capacity of the spare host server, regional diversity of host servers in the service tier that the target host server is in, or any combination thereof. In some embodiments, the priority is used to select the target host server for replacement by the spare host server (i.e. top priority is selected first). Following replacement, the target host server can be updated, repaired, re-started, or analyzed for error. Also following the replacement, the index data structure and/or the service executables can be updated.

In at least one embodiment, the one or more spare host servers used for replacement are assigned to a service tier, such as the service tier that the target host server is in. In other embodiments, the one or more spare host servers used for replacement are not assigned any service tier, and use of the spare host servers require a competition of priority of use amongst the determined updates needed in the different service tiers. In some embodiments, the one or more spare host servers are on a same rack as the target host server, where host servers on the rack share network communication hardwares.

The disclosed maintenance system enables updating of a service tier of index servers while the service tier is serving traffic. The disclosed maintenance system also minimizes number of host servers needed to run a number service tiers by allowing sharing of spare host servers between service tiers.

Some embodiments have other aspects, elements, features, and steps in addition to or in place of what is described above. These potential additions and replacements are described throughout the rest of the specification

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
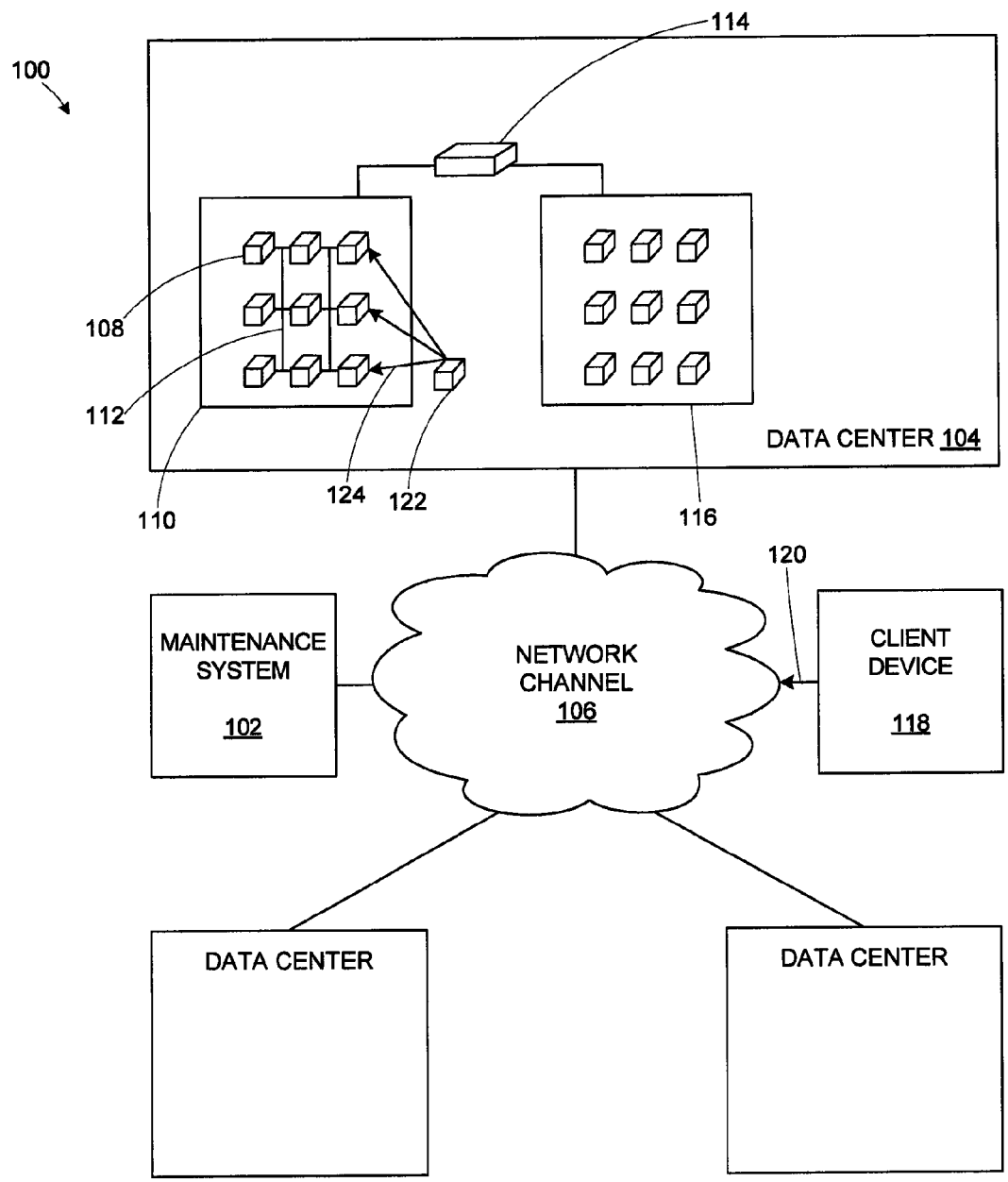
FIG. 1 is an example of a system environment for running a maintenance system to update host servers.

Referring now to FIG. 1, therein is shown an example of a system environment 100 for running a maintenance system 102 to update host servers. The maintenance system 102 is a computer system for scheduling updates to host servers, such as host servers in one or more data centers. For example, the maintenance system 102 can provide updates to a data center 104. The data center 104 is a collection of host server computers all sharing a physical location/region. The maintenance system 102 can manage one or more of the data centers 104. The maintenance system 102 can be separate from the host servers in the data center 104 or can be implemented as part of the host servers.

In one embodiment, the data center 104 can communicate with the maintenance system 102 via a network channel 106. The data center 104 in one region can also communicate with one or more data centers through the network channel 106. In another embodiment, the maintenance system 102 can reside in the data center 104 as one or more of the host servers.

The network channel 106 is a network system medium for communication. For example, the network channel 106 can include any combination of local area and/or wide area networks, using both wired and wireless communication systems. The network channel 106 can include a network cable, an Ethernet cable, a wire, a specialized storage cable, a storage bus, Serial ATA cable, IDE cable, or any combination thereof.

In one embodiment, the network channel 106 uses standard communications technologies and/or protocols. Thus, the network channel 106 may include links using technologies such as Ethernet, 802.11, worldwide interoperability for microwave access (WiMAX), 3G, 4G, CDMA, digital subscriber line (DSL), etc. Similarly, the networking protocols used on the network channel 106 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network channel 106 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). Data exchanged over the network channel 106 can be part of intra-cluster communication for cluster-based filesystems, such as the Hadoop Distributed File System.

The data center 104 can include a host server 108. The host server 108 is a computer server, such as the computer system described in FIG. 8. The host server 108 can be part of a rack, such as a first rack 110 in the data center 104. The first rack 110 is a housing structure for electronic devices, such as the host server computers. The first rack 110 can include multiple mounting slots or bays, each designed to hold a hardware unit secured in place. Host servers, such as the host server 108, can be placed in a low-profile enclosure in the rack. A single rack, such as the first rack 110 can contain multiple host servers stacked one above the other, consolidating network resources and minimizing the required space. The server rack configuration can simplify cabling among network components. Within the first rack 110, the host server 108 can communicate with other host servers within the first rack 110 via an intra-rack connection 112. The intra-rack connection 112 is a medium for communication within a rack. For example, the intra-rack connection 112 can be cables or buses connecting the host servers in respective slots to a rack switch.

The host server 108 in the first rack 110 can also communicate via an inter-rack connection 114 with other host servers in a second rack 116. The inter-rack connection 114 is a medium for communication between host servers of server racks. For example, the inter-rack connection 114 can be an uplink connection from the rack switch to a data center switch. In at least some embodiments, the inter-rack connection 114 has less bandwidth and/or is slower than the intra-rack connection 112. For this reason, the host servers serving under the same service tier preferably are ran on the same server rack.

Each of the host servers, such as the host server 108, can run data services, such an indexing service to a client device 118. The client device 118 is a computing device capable of receiving user input as well as transmitting and/or receiving data via the network channel 106. In one embodiment, the client device 118 is a conventional computer system, such as a desktop or laptop computer. In another embodiment, the client device 118 may be a device having computer functionality, such as personal digital assistants (PDAs), mobile telephones, tablets, smart-phones or similar devices. In yet another embodiment, the client device 118 can be a virtualized desktop running on a cloud computing service. The client device 118 is configured to communicate with the data center 104, and/or other data centers in the system environment 100 via the network channel 106. In one embodiment, the client device 118 executes an application allowing a user of the client device 118 to interact with the host server 108 to retrieve a piece of content or a link to content with a client request 120. For example, the client device 118 can execute a browser application to enable interaction between the client device 118 and a website whose contents are indexed by the host server 108. In another embodiment, the client device 118 interacts with the host server 108 through an application programming interface (API) that runs on the native operating system of the client device 118, such as IOS® or ANDROID™.

The client request 120 of the client device 118 can be routed to the data center 104. The client request 120 can be processed by an aggregator server 122 in the data center 104. The aggregator server 122 is a host server that collects the client request 120 made by the client device 118 and converts the client request 120 into one or more query messages 124 to one or more host servers, such as the host server 108. Results from the query messages 124 returned from the one or more host servers are then aggregated and returned to the client device 118. The aggregator server 122 can be assigned to a group of host servers and be collocated with the group of host servers.

The host server 108 is able to respond to the client request 120 and/or the query messages 124 generated by the aggregator server 122 with a key in an index data structure, such as an index table. When and how updates to the index table are propagated to the host server 108 is managed by the maintenance system 102. Updates to one or more executable programs on the host server 108 that facilitates the servicing of the client request 120 and the query messages 124 are also managed by the maintenance system 102.

Figure 2:
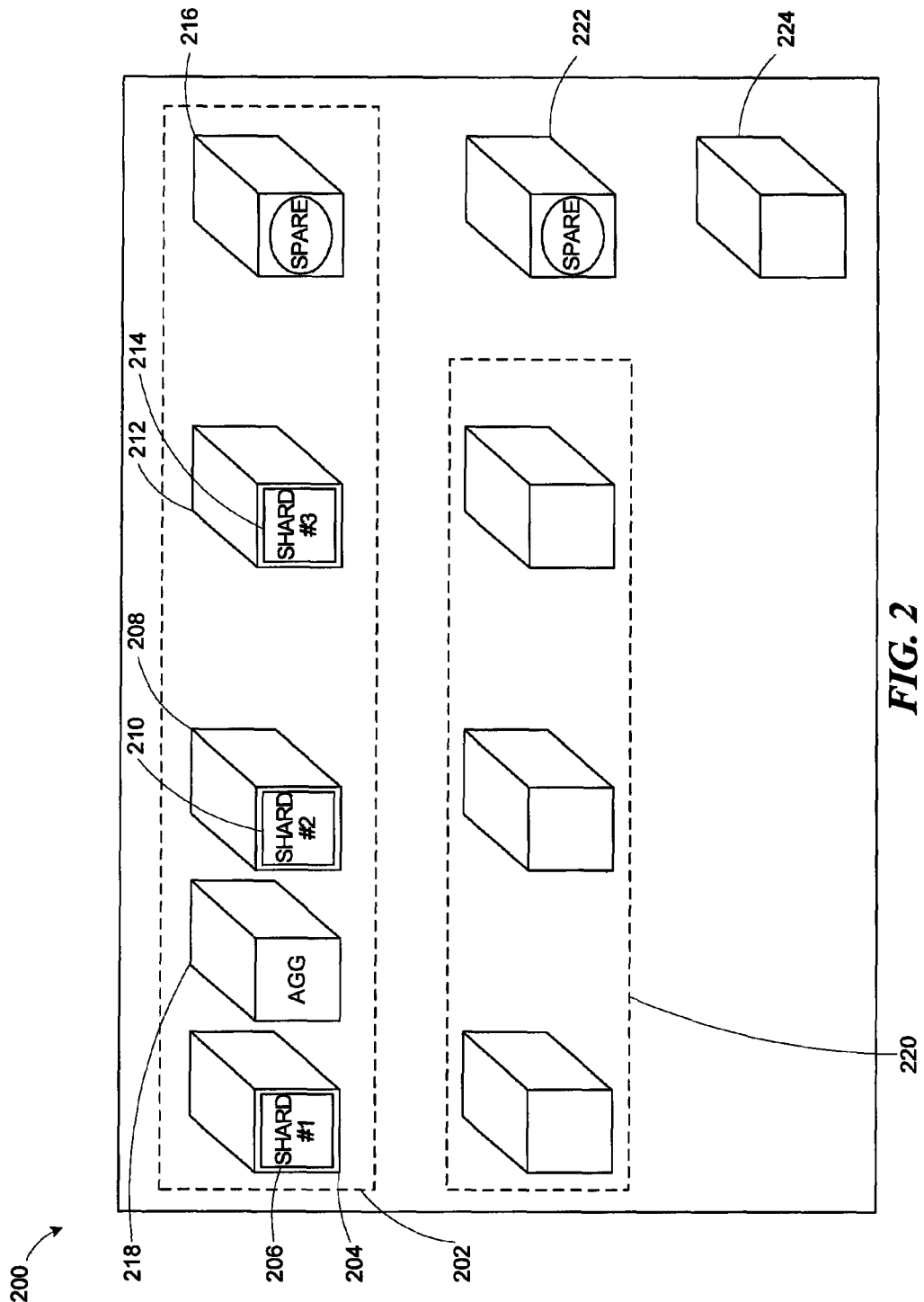
FIG. 2 is an example of a server group of host servers.

Referring now to FIG. 2, therein is shown is an example of a server group 200 of host servers. The server group 200 is a collection of servers servicing client devices. The collection of servers can provide the client devices with contents from one or more websites. In one embodiment, the server group 200 can be a collection of servers within a single rack, such as the first rack 110 of FIG. 1. In another embodiment, the server group 200 can be a collection of servers within a single data center, such as the data center 104 of FIG. 1. In yet another embodiment, the server group 200 can be a collection of servers across multiple physical regions and across multiple data centers.

The server group 200 can include divisions of host servers therein into service tiers. The service tiers are divided based on operational functions, such as service of links, pictures, text, browser scripts, multimedia contents, or any combination thereof. In some embodiments, the host servers of each service tier can be co-located on a server rack, such as the first rack 110 of FIG. 1. Each service tier can be as small as having only one host server assigned to it, or be as big as having more than a hundred host servers assigned to it. A website can categorize service tiers in a hierarchical tree-structure. First the service tiers are divided by operational function. Then the service tiers can be divided by geographical location, such as data center location. The leaf nodes of the tree-structure would be replicas of the service tier. Each replica of the service tier is treated independently as a unique service tier for the purpose of the maintenance system 102. The replicas of the service tier can reside on the same server rack, the same data center, the same physical region, or distributed across different physical regions and data centers.

For example, the server group 200 can include a first tier 202. The first tier 202 includes a collection of servers performing an operational function, such as providing pictures or links to pictures for a website based on an index key. The first tier 202 can include a first host server 204. The first host server 204 is a computer host server, such as the host server 108 of FIG. 1. The first host server 204 can include a first shard 206 of index data for the operational function. For example, the first shard 206 can be a third of the complete index data for providing the pictures or the links to pictures for the website. The index data shards act as parts of a dictionary. The website's service servers system can independently divide the index data shards into pieces of data that do not overlap with each other. The data shards can be efficiently formatted in a base index format for quick access to the stored content. Real-time updates can be pushed to the host servers of the first tier 202 in a raw format. However, because the real-time updates are not stored in an efficient format, the host servers would run out of memory quickly without updates of the data shards in the base index format.

The first tier 202 can also include a second host server 208. The second host server 208 is a computer host server, such as the host server 108 of FIG. 1. The second host server 208 can include a second shard 210 of the index data for the operational function of the first tier 202. For example, the second shard 210 can be another third of the complete index data for providing the pictures or the links to pictures for the website. The first tier 202 can further include a third host server 212. The third host server 212 is a computer host server, such as the host server 108 of FIG. 1. The third host server 212 can include a third shard 214 of the index data for the operational function of the first tier 202. For example, the third shard 214 can be yet another third of the complete index data for providing the pictures or the links to pictures for the website. For the same service tier, different data shards have no overlaps. For example, the third shard 214, the second shard 210, and the first shard 206 do not have an overlap of data with each other.

The first tier 202 can also include one or more instances of an in-tier spare host server 216. The in-tier spare host server 216 is a computer host server, such as the host server 108 of FIG. 1. The in-tier spare host server 216 is not actively servicing any client request for data. Instead, the in-tier spare host server 216 is either not running a service application or is running a service application in a idle/pending mode, where the idle/pending mode meant that the service application can readily service client requests.

The first tier 202 can be serviced by an aggregator 218. The aggregator 218 can be a dedicated aggregator server just for the first tier 202 or shared by other service tiers. The aggregator 218 can be the aggregator server 122 of FIG. 1. The aggregator 218 is a host server that collects client requests for the first tier 202. The aggregator 218 converts the client requests into individual query messages for host servers in the first tier 202. The aggregator 218 includes logical modules to determine which shard of the index data can answer a particular client request. Once determined, the aggregator 218 passes an individual query message to the appropriate host server with the appropriate shard. In some embodiments, the aggregator for a service tier can be co-located with the host servers of the service tier, such as on the same server rack.

The server group 200 can include other tiers of host servers as well. For example, the server group 200 can include a second tier 220 for providing scripts or links to scripts for client requests. Each of the service tier can provide a different content object via an index, including multimedia content, text, script, executables, or any combination thereof. Each tier can include multiple host servers or just a single host server. In FIG. 2, the aggregator 218 is illustrated to be within the first tier 202. However, it is understood that the aggregator 218 can be shared amongst different service tiers as well.

The server group 200 can also include one or more instances of a tierless spare host server 222. Similar to the in-tier spare host server 216, the tierless spare host server 222 is a host server that is not actively servicing client requests. The tierless spare host server 222 is shared amongst a number of service tiers. Each service tier can use more than one instance of the tierless spare host server 222 at one time, hence allowing a speedier replacement of host servers in each service tier. However, the tierless spare host server 222 does not belong to any particular tier. The tierless spare host server enables savings of having multiple spare hosts for each service tier. The savings are significant when the server group 200 has many small sized service tiers having small number of host servers therein. To avoid having service tiers of the same index type competing for the same tierless spare host server 222, replicas of the same index type generally are not assigned to the same server group 200 unless to alleviated high client request traffic.

The server group 200 can be assigned based on the service tiers that are sharing the same instances of the tierless spare host server 222. Because the service tiers are sharing and competing for the same tierless spare host servers 222, the server group 200 can be linked together by the intra-rack connection 112 or the inter-rack connection 114 of FIG. 1 to provide for a speedier connection. The server group 200 can include a fourth host server 224 not included in any tier. The fourth host server 224 can be a host server computer serving a separate function other than to service client requests, such as maintaining an I/O log like the host servers that belong to a tier.

Figure 3:
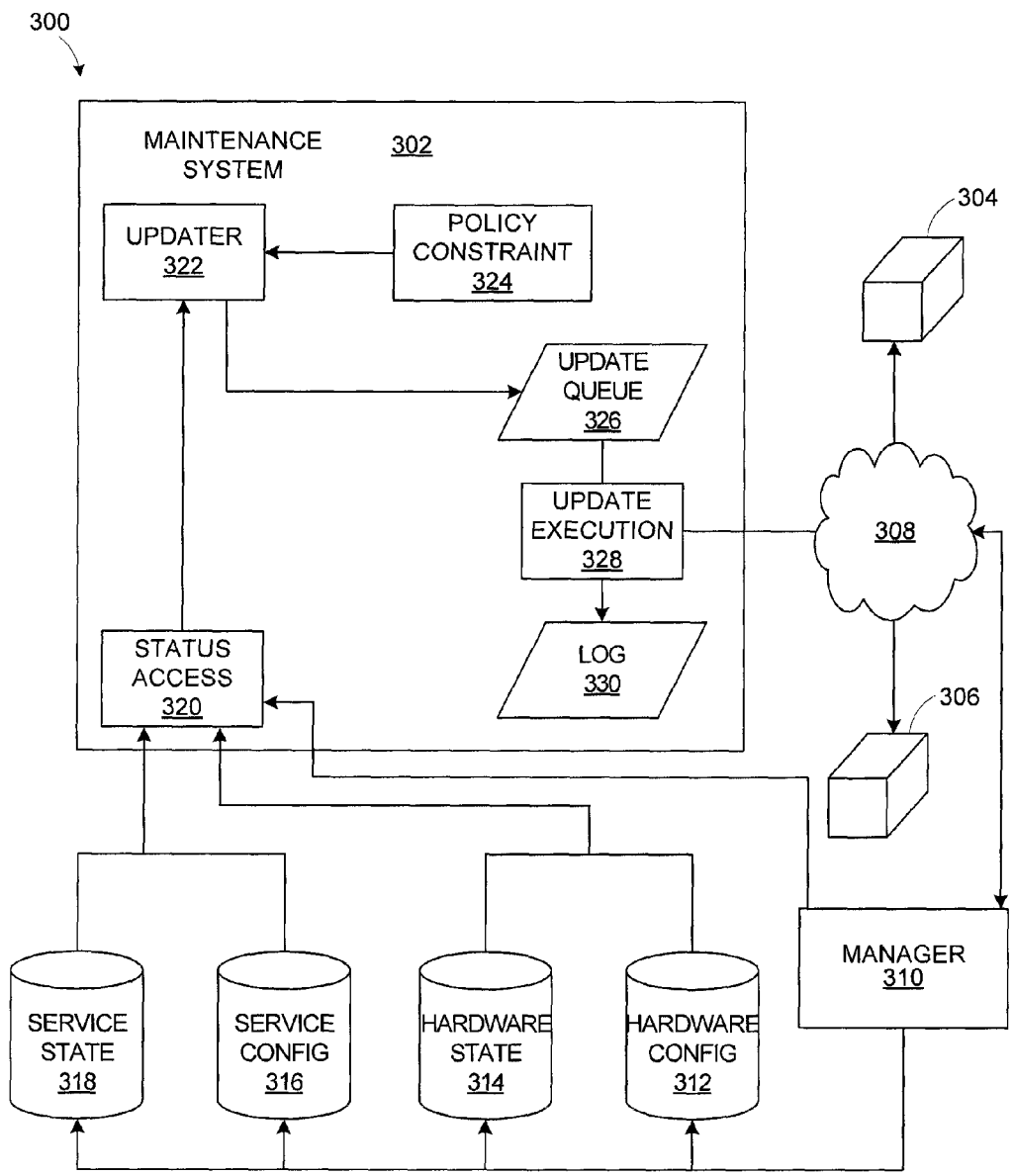
FIG. 3 is a service servers system maintained by a maintenance system.

Referring now to FIG. 3, therein is shown a service servers system 300 maintained by a maintenance system 302. The service servers system 300 can include a number of host servers, such as the server group 300. The service servers system 300 can also include a number of data centers and a number of sub-filesystems. The maintenance system 302 can be the maintenance system 102 of FIG. 1. The maintenance system 302 is for scheduling and executing maintenance activities on host servers of the service servers system 300, such as an active host server 304. The active host server 304 can be the host server 108 of FIG. 1. The service servers system 300 can include other host servers, including a spare host server 306. The spare host server 306 can be the in-tier spare host server 216 of FIG. 2 or the tierless spare host server 222 of FIG. 2. The maintenance system 302 can communicate with the active host server 304 via a network channel 308. The network channel 308 is a communication channel amongst host server computers of the service servers system 300, including index servers, aggregator servers, and other computer servers serving different functions of the service servers system 300. The network channel 308 can be the network channel 106 of FIG. 1.

Optionally, the service servers system 300 can include a service host manager 310. The file system manager 310 is a host server that manages the service servers available on the service servers system 300. The service host manager 310 is configured to provide access to host servers on the service servers system 300 and provide metadata related to the operation of the host servers. For example, the service host manager 310 can be a manager module of a networked filesystem. The service servers system 300 can include one or more instances of the service host manager 310. The service host manager 310 can share the same hardware as the maintenance system 302. In some embodiments, the service host manager 310 can be part of the maintenance system 302 and vice versa.

The service host manager 310 can maintain a hardware configuration store 312, a hardware state store 314, a service configuration store 316, and a service state store 318. The storages or "stores", described in this disclosure are hardware components or portions of hardware components for storing digital data. Each of the storage can be a single physical entity or distributed through multiple physical devices. Each of the storage can be on separate physical device or share the same physical device or devices. Each of the stores can allocate specific storage spaces for run-time applications. The stores can be saved on the active host server 304 (not shown), on any one of the computer servers in the service servers system 300, or distributed across the host servers of the service servers system 300.

The hardware configuration store 312 stores the physical configuration of the host servers in the service servers system 300. For example, the hardware configuration store 312 can maintain a layout of host server name, address, location, data center identification, geographical location, rack identification, or any combination thereof. The hardware configuration store 312 can also store the physical attributes of the host server, including filesystem type, upload and download bandwidth, server computer type, network type, processing speed, capacity, network speed and capacity, or any combination thereof. The hardware state store 314 stores and updates the state information of each of the host servers in the service servers system 300. For example, the hardware state store 314 can store and update the traffic level of a host server, the tier assigned to the host server, whether the host server is actively serving client requests, whether the host server has failed an error check, or any combination thereof.

The service configuration store 316 stores and updates the configuration of the host servers in the service servers system 300. For example, the service configuration store 316 can maintain and update a list of operating service tiers of the host servers, and which of the host servers belong to which service tier. The list of operating service tiers include services provided by each service tier and the service applications required to run those services. The service configuration store 316 can also store and update a web server application configuration on the host servers, such as Serf configuration. The service configuration store 316 can also include a flag indicating whether the automatic rolling update mechanism is disclosed in FIGS. 4-7 is enabled for each host server or each service tier.

The service state store 318 stores and updates the states of the services provided by the host servers in the service servers system 300, such as the services provided by each tier of the service servers system 300. For example, the service state store 318 can maintain and update a record of traffic served by each service tier, history of the versions of the index data used by the service tier, history of the versions of executables, binaries, and kernel used for the service tier host servers, or any combination thereof. The division of the configuration and state information in these stores are for illustrative purposes. The stores can be joined in any combination, or subdivided in various ways for access by a status access module 320.

The maintenance system 302 can be implemented by a computer system with at least one processor and one non-transitory memory. The maintenance system 302 can also be on the same computer system as the maintenance system 102 of FIG. 1 or the service servers system 300. The maintenance system 302 can be implemented by a computer system of FIG. 8. The maintenance system 302 can be implemented as a module in each of the host servers in the service servers system 300.

The maintenance system 302 can include one or more methods of selecting a host server for replacement by a spare host server. The one or more methods can be implemented by components, storages, and modules described below. The modules can be implemented as hardware components, software modules, or any combination thereof. For example, the modules described can be software modules implemented as instructions on a non-transitory memory capable of being executed by a processor or a controller on a machine described in FIG. 8.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

The maintenance system 302 can include additional, fewer, or different modules for various applications. Conventional components such as network interfaces, security functions, load balancers, failover servers, management and network operations consoles, and the like are not shown so as to not obscure the details of the system.

The maintenance system 302 can run continuously or periodically within the service servers system 300. The maintenance system 302 includes an updater module 322, where the module can run continuously to update the host servers of the service servers system 300, such as the active host server 304. The updater module 322 can be activated periodically, such as by a Cron job scheduler every 15 minutes or every 4 hours. The updater module 322 is configured to identify the active host server 304 that needs to update, such as an update of a shard of index data, an update on an executable binary or script for a data service, an update on a kernel, or a repair update. The updater module 322 is also configured to schedule a replacement of the data service of the active host server 304 by the data service of the spare host server 306. The updater module 322 can be coupled to the status access module 320 to access the hardware configuration store 312, the hardware state store 314, the service configuration store 316, the service state store 318, or any combination thereof. The updater module 322 can be coupled to a policy constraint store 324. The policy constraint store 324 can define the rules of selecting the active host server 304 and the spare host server 306 based on the hardware and service states and hardware and service configurations. The policy constraint store 324 can be stored on the maintenance system 302, other host server on the service servers system 300, or distributed across the host servers of the service servers system 300.

The updater module 322 utilizes a rolling update mechanism further described in FIGS. 4-7 below. The rolling update mechanism includes the updater module 322 first determining whether the active host server 304 has the highest priority amongst a server group for a data update or an executable (e.g. binary or script) update, and then preparing the spare host server 306 with the necessary updates to replace the active host server 304. The server group can be the server group 200 of FIG. 2. In some embodiments, the active host server 304 can include a binary or an executable that messages the maintenance system 302 when it is in need of an update. In some embodiments, the updater module 322 checks with the status access module 320 to determine whether the active host server 304 requires maintenance, such as due to old data, stalled service, or failed error check. Stalled service can be due to the service application crashing or the host server hardware malfunctioning. Failed error check can include the active host server 304 producing data errors or a checksum of the data produced by the active host server 304 that no longer matches up.

Service tiers can be organized in a hierarchy, starting out with index type, then geographical region of the tier's servers, and then replica instances. The updater module 322 can start from the root of the hierarchy, and find all leaf service tiers of the hierarchy. The updater module 322 can run a loop on all of the leaf service tiers to identify potential need for maintenance update. Each leaf service tier is generally independent from one another except when competing for a shared tierless spare host server as described below. The states and configuration of each leaf service tier is compared to the rules outlined in the policy constraint store 324 to determine whether to schedule a replacement for a host server in the service tier.

The updater module 322 can be configured differently for every index type of the service tier. The maintenance updates cycles of the updater module 322 can be staggered from service tier to service tier, allowing each service tier the opportunity to use up to all of the shared spares, such as the tierless spare host server 222 of FIG. 2.

The updater module 322 can also serve to schedule updates and replacement of active host servers based on bandwidth available. The updater module 322 can keep a map of on going preparations of spare host servers including downloads of the index shards, binaries, scripts, and kernel updates. The updater module 322 can ensure that the number and amount of downloads do not surpass a pre-defined threshold that may overload or crash the host servers of the service tiers being updated. The map of on going preparations/downloads can be facilitated by the service host manager 310. The service servers system 300 can include a networked filesystem node in each geographical region, where each tier can pull from the nearest region and then control the bandwidth map of each region to satisfy the pre-defined bandwidth threshold.

The updater module 322 can further schedule updates and replacements based on load balancing constraints. For example, when there are multiple service tier replicas of the same index type in the same region, the policy constraint store 324 can include a constraint where the updater module 322 spreads the replacements of host servers across the different service tier replicas. This enables the updater module 322 to balance the load of the service tier replicas. For another example, when there are multiple service tier replicas of the same index type in the same region, the policy constraint store 324 can include a constraint to update different index shards across the service tier replicas. In this manner, the service tier replicas, once having downloaded the index shards, can be cross-pollinated locally to each other. This allows a faster preparation time of the replacement of host servers.

In some embodiments, the updater module 322 can facilitate the competition amongst active host servers in need of an update. The updater module 322 can determine a priority of the active host server 304 to be updated. When the active host server 304 is disconnected, power off, or missing from the status access module 320, the updater module 322 can assign the missing host server with the highest priority to be replaced by the spare host server 306. When the active host server 304 is detected to be in repair or in need of repair, the updater module 322 can assign the error-prone host server with the second highest priority. Priority assignments can be configured and adjusted via an administration interface provided by the maintenance system 302. Following higher priority involving hardware or software repair, the updater module 322 can assign priority based on age of index data in the base index format (i.e. instead of real-time update), age of service application executables, age of kernel, or any combination thereof. In at least some embodiments, the older the age of index data, executables, or kernel, the higher the priority for the active host server 304 to be replaced by the data service of the spare host server.

The updater module 322, after identifying the active host server 304 in need of update and selecting the spare host server 306 for the update, is configured to prepare the spare host server 306 with the most up-to-date index data, executables, and kernel. Preparation of the spare host server 306 can include bringing the spare host server 306 to an optimal state pre-defined in the policy constraint store 324. The copying of the most up-to-date index data shards, binary, script, and kernel can be facilitated by the filesystem manage 310, such as the HDFS manager. Part of preparation can also include automatic or manual repairing of the spare host server 306, such as by rebooting the spare host server 306, or restarting or reconfiguration of the service application on the spare host server 306. Manual repair can be prompted via an alert on an administration interface, an email, a SMS notification, or any combination thereof to put a host server into the repair mode. Once the spare host server 306 is prepared, the updater module 322 on the next update cycle would schedule the spare host server 306 to start receiving client requests, and offline the active host server 306 to become a spare host server 306 on the next update cycle.

The updater module 322 stores update commands in an update queue 326 of the maintenance system 302. The update queue 326 is a store of the maintenance system 302 that records a schedule of update commands, such as update commands for the active host server 304 and/or the spare host server 306. The maintenance system 302 includes an update execution module 328. The update execution module 328 reads the update queue 326 and executes the update commands either directly to the host servers or through the service host manager 310. The update commands can be executed in parallel, in sequential phases, or a combination thereof. All of the update commands are stored in an update command log 330 of the maintenance system 302. The update command log 330 keeps track of the previous update commands. In some embodiments, the updater module 322 determines which of the host server to update based on the update command log 330.

The updates of the index data, executables, and kernel can be pushed from an origination filesystem with the most up-to-date information. The origination filesystem can be a Hadoop filesystem managed by the operators of the service servers system 300.

The techniques introduced in the modules herein can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 4:
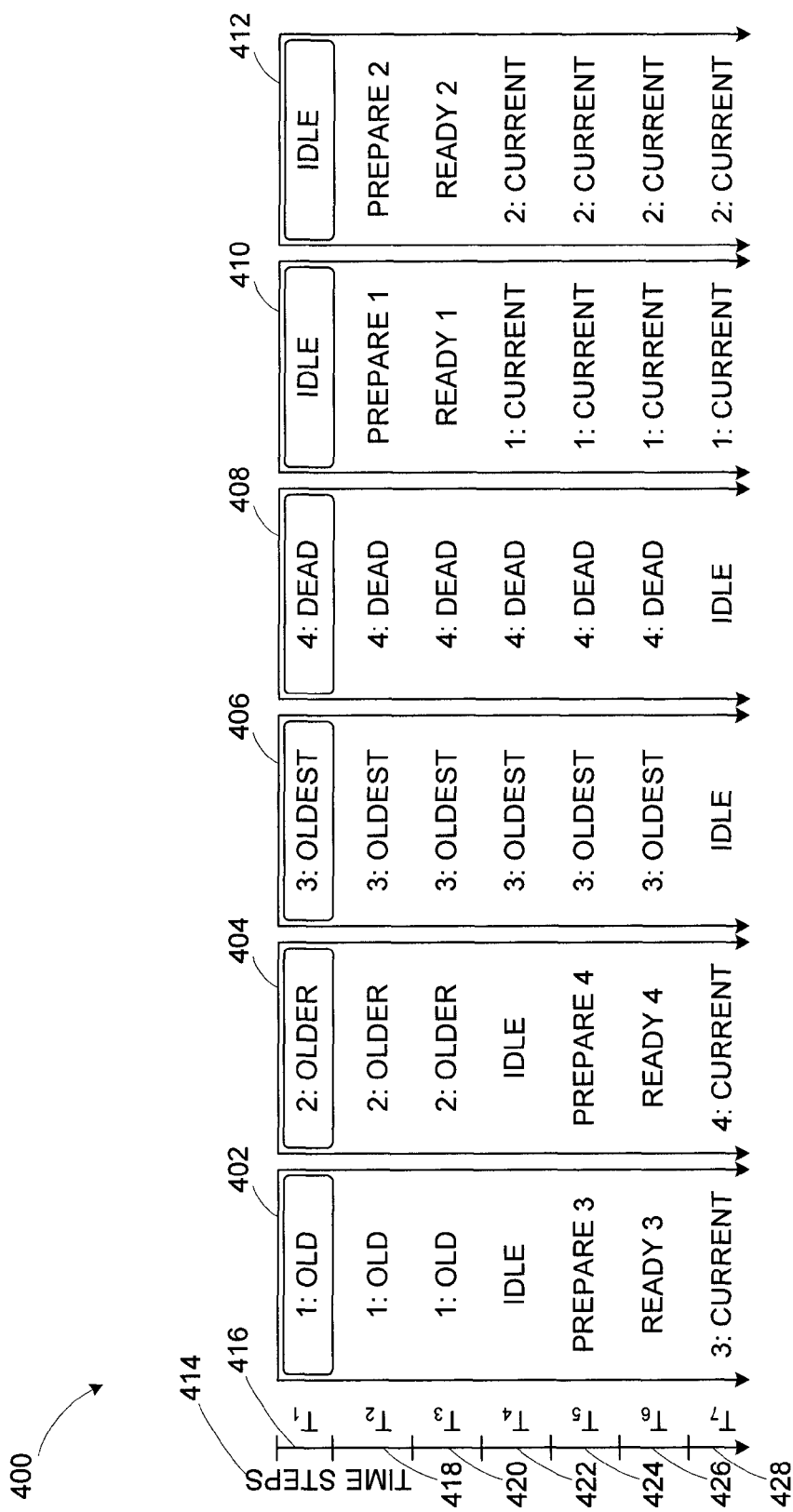
FIG. 4 is an example of a sequence diagram of a single tier of host servers.

Referring now to FIG. 4, therein is shown an example of a sequence diagram of a single tier 400 of host servers. In this example, the single tier 400 includes a first host server 402, a second host server 404, a third host server 406, a fourth host server 408, a fifth host server 410, and a sixth host server 412. Other servers may be included in the single tier 400 to perform other functions, such as the aggregator 218 of FIG. 2. The sequence diagram illustrates the states of host servers in the single tier 400 in time steps 414. The data shards of the single tier 400 can be divided into four partitions. A segregation algorithm on the maintenance system 302 and/or the service host manager 310 can determine what part of the index data of the single tier 400 go into which partition.

At a first time step 416, the first host server 402 has a first partition data shard of the single tier 400 that is old (i.e. not current compared to the source of the data). The second host server 404 has a second partition data shard of the single tier 400 that is older than the data shard of the first host server 402. The third host server 406 has a third partition data shard of the single tier 400 that is oldest compared to all operating servers in the single tier 400. The fourth host server 408 has a fourth partition data shard of the single tier 400. The fourth host server 408 is in a "dead" state at the first time step 416. The "dead" state here refers to a state where the host server is no longer capable of servicing the single tier 400. Hardware or software failure can be responsible for the "dead" state of the fourth host server 408. Because the fourth host server 408 is in the "dead" state, the fourth partition data shard of the single tier 400 would not be accessible to any of client devices through client requests. In this example, the fourth host server 408 is in the "dead" state, however, it is understood that the fourth host server 408 may also be in a "malfunction" state where the fourth host server 408 is operational but potentially should not be trusted due to a failed error check. The fifth host server 410 and the sixth host server 412 at the first time step 416 are idling. Idling host servers wait in the idle state until a command is received to prepare for servicing.

In some embodiments, even when the data shards of the host servers are considered "old" (i.e. not current compared to the source of the data), the host servers can still receive real-time updates of the index data such that the data shards plus the real-time updates can provide the most current index data. However, the real-time updates are not stored in an efficient format, such as a base index format of the data shards. Hence, periodic maintenance updates to the data shards of the host servers are still needed to run the host servers in an efficient manner.

At a second time step 418, the fifth host server 410 and the sixth host server 412 can receive an update command from the maintenance system 302 of FIG. 3. In particular, the updater module 322 can send the update command to transfer updated data shards of the single tier 400 to the fifth host server 410 and the sixth host server 412. The fifth host server 410 and the sixth host server 412 upon receiving the updated data shards then would be change to a "prepare" state, where the fifth host server 410 and the sixth host server 412 wait for the transfer of the updated data shard to complete. The other host servers remain in the same states as in the previous cycle. In this example, the updated data shard for the fifth host server 410 is part of the first partition data shard and the updated data shard for the sixth host server 412 is part of the second partition data shard.

At a third time step 420, the fifth host server 410 and the sixth host server 412 complete the transfer of the updated data shards. Once completed, the data shards are loaded into memory and a servicing application within the fifth host server 410 and the sixth host server 412 is launched or restarted. The fifth host server 410 and the sixth host server 412 are changed to a "ready" state. In the "ready" state, the fifth host server 410 and the sixth host server 412 can receive client requests for index data contained in the updated data shards. However, in the "ready" state, client requests are not actually forwarded to the host servers. Before going into the "ready" state, the fifth host server 410 and the sixth host server 412 may be required to restart the service application. The other host servers remain in the same states as in the previous cycle.

At a fourth time step 422, the first host server 402 and the second host server 404 receive command to be moved to the idle state. The fifth host server 410 and the sixth host server 412 then begin to receive client requests, such as from the aggregator 218 of FIG. 2. Alternatively, it is understood that the fifth host server 410 and the sixth host server 412 can first start to receive client requests before the first host server 402 and the second host server 404 are brought into the idle state. At the fourth time step 422, the fifth host server 410 and the sixth host server 412 enter into a "current" state where the data shards being served are the most current and up-to-date. For the fifth host server 410, the current version of the first partition data shard is used to service client requests. For the sixth host server 412, the current version of the second partition data shard is used to service client requests. The other host servers remain in the same states as in the previous cycle.

At a fifth time step 424, the first host server 402 and the second host server 404 enter into the "prepare" state, as update commands are received at the first host server 402 and the second host server 404. Up-to-date data shards are then transferred to the first host server 402 and the second host server 404, such as the third partition data shard and the fourth partition data shard, respectively. The updated data shards at the fifth time step 424 can be as current as the updated data shards at the second time step 418. However, if enough time has lapse, the updated data shards of the fifth time step 424 may be more up-to-date than the updated data shards at the second time step 418. The other host servers remain in the same states as in the previous cycle.

At a sixth time step 426, as the updated data shards are transferred and loaded into memory, the first host server 402 and the second host server 404 enter into the "ready" state. The other host servers remain in the same states as in the previous cycle. At a seventh time step 428, the third host server 406 and the fourth host server 408 are moved into the "idle" state. Also at the seventh time step 428, the first host server 402 and the second host server 404 begin to serve the current versions of the third partition data shard and the fourth partition data shard.

Figure 5:
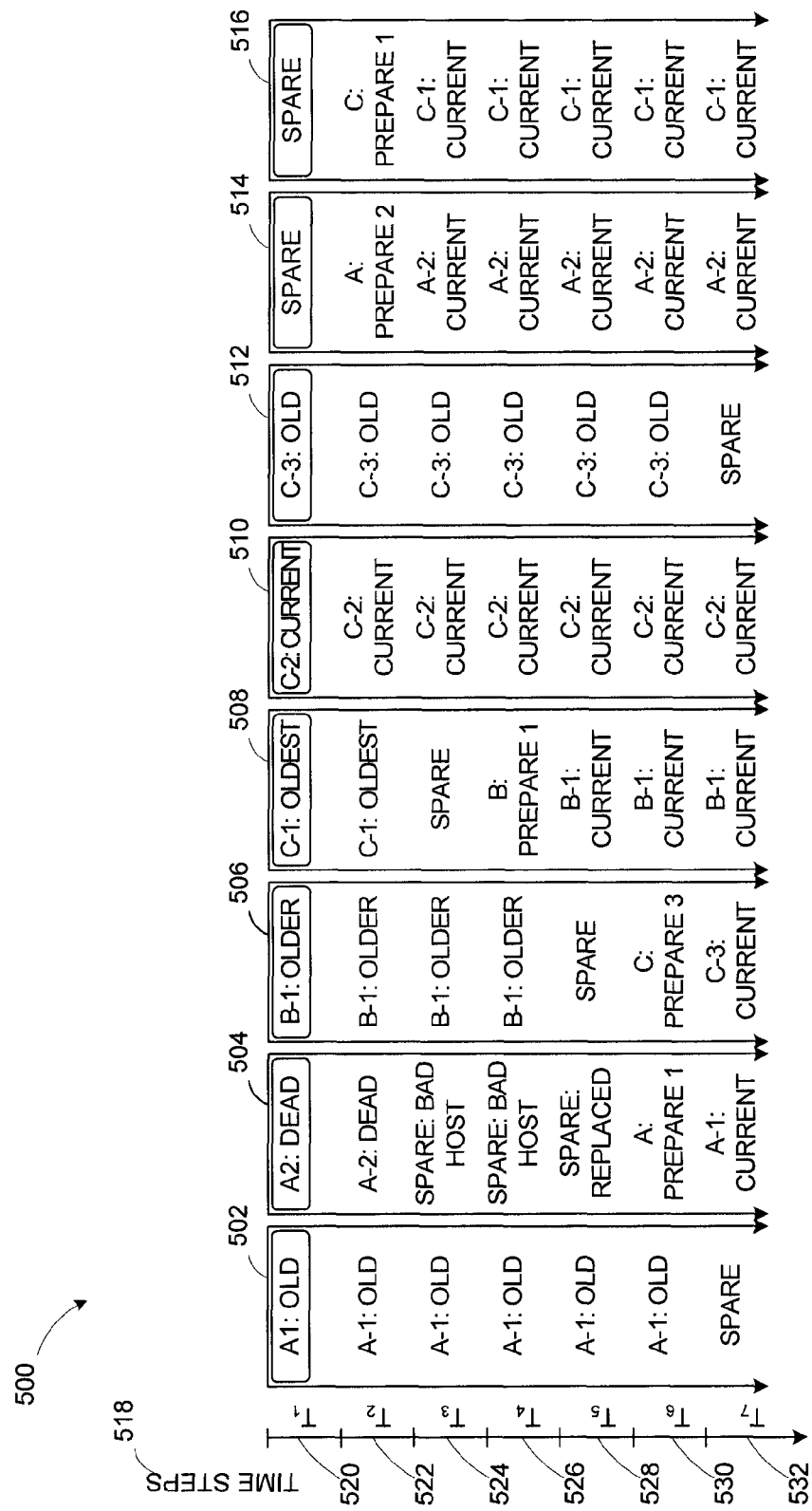
FIG. 5 is an example of a sequence diagram of a group of host servers.

Referring now to FIG. 5, therein is shown an example of a sequence diagram of a group 500 of host servers. The group 500 includes multiple tiers of the host servers. In some embodiments, the group 500 is part of a hardware rack of host servers sharing hardware. In this example, the group 500 includes a first host server 502, a second host server 504, a third host server 506, a fourth host server 508, a fifth host server 510, a sixth host server 512, a seventh host server 514, and an eighth host server 516. The sequence diagram illustrates the states of host servers in the group 500 in time steps 518. The host servers are divided into three separate tiers in this example, including: tier-A with shards A-1 and A-2, tier-B with only one shard, and tier-C with shards C-1, C-2, and C-3. The maintenance updates needed for each of the three tiers compete for the available tierless spare host servers by petitioning for replacement based on the priority of the maintenance update. The determination of the priority can be based on the policy constraint 324 of FIG. 3.

At a first time step 520, the first host server 502 contains old A-1 data shard and is servicing under tier-A. The second host server 504 contains A-2 data shard under tier-A. However, at the first time step 520, the second host server 504 is in the "dead" state. The third host server 506 contains B-1 data shard under tier-B. The B-1 data shard at the first time step 520 is older than the A-1 data shard in terms of the time stamp when the data shard is updated. The fourth host server 508 contains C-1 data shard under tier-C. The C-1 data shard is older than the B-1 datashard of the third host server 506. The fifth host server 510 contains C-2 data shard under tier-C. The C-2 data shard is current and up-to-date (i.e. more up-to-date than the A-1 data shard). The sixth host server 512 contains C-3 data shard under tier-C. The C-3 data shard is older than the C-2 data shard, newer than the B-1 data shard, and approximately as up-to-date as the A-1 data shard. The seventh host server 514 and the eighth host server 516 can both in a "spare" mode. Similar to the "idle" mode described in FIG. 4, the "spare" mode is where the host servers are ready to service client requests. However, unlike the "idle" mode where a host server is already assigned to a tier, in the "spare" mode, a host server is not assigned to any particular tier.

At a second time step 522, the seventh host server 514 is prepared for service under tier-A by receiving an updated A-2 data shard. Preparation may include downloading the updated data shard and launching the service application. In some instances, the host server, such as the seventh host server 514, would be re-booted when preparing for service under a new service tier. The maintenance system 102 may determine that a host server in the "dead" state has the highest priority for replacement and hence the A-2 data shard is the first to get a replacement host server. At the second time step 522, the eighth host server 516 is prepared for service under tier-C by receiving an updated C-1 data shard. The maintenance system 102 may determine that a host server having the oldest data shard in the group 500 should get a high priority for replacement and hence the C-1 shard is second in terms of priority to get a replacement host server. The other host servers remain in the same states as in the previous cycle.

At a third time step 524, the seventh host server 514 and the eighth host server 516 come online to the "current" state and start servicing client requests in their respective tiers (tier A and tier C) with the up-to-date data shards. The second host server 504 and the fourth host server 508 are brought offline to the "spare" state. The second host server 504, however, remains in as a bad host even as a spare due to hardware or software failure. As a bad host, the second host server 504 cannot be used to replace other host servers until the second host server 504 is repaired. The other host servers remain in the same states as in the previous cycle.

At a fourth time step 526, the fourth host server 508 is prepared for service under tier-B by receiving an updated B-1 data shard. The maintenance system 102 may determine that the B-1 data shard in the third host server 506 is the oldest data shard in the group 500, and hence the third host server 506 should be next in line to be replaced by the fourth host server 508. The other host servers remain in the same states as in the previous cycle.

At a fifth time step 528, the fourth host server 508 comes online to the "current" state and start servicing client requests in tier-B. The third host server 506 is brought offline to be in the "spare" state. Also at the fifth time step 528, the bad host in the second host server 504 is repaired or replaced, allowing the second host server 504 to be a functional spare host. The other host servers remain in the same states as in the previous cycle.

At a sixth time step 530, the second host server 504 is prepared for service under tier-A by receiving an updated A-1 data shard. The third host server 506 is prepared for service under tier-C by receiving an updated C-3 data shard. The maintenance system 102 may determine that the A-1 data shard in the first host server 502 and the C-3 data shard in the sixth host server 512 have the oldest time stamp compared to the other data shards, and hence the A-1 data shard and the C-3 data shards are the next-in-line to be have a replacement host server. The other host servers remain in the same states as in the previous cycle.

At a seventh time step 532, the second host server 504 and the third host server 506 come online to the "current" state and start servicing client requests in tier-A and tier-C respectively. Replaced host servers, the first host server 502 and the sixth host server 512, enter into the "spare" state once their replacements come online. While in this example in FIG. 5, a spare host server is used in every time cycle of an update, it is understood that the maintenance system can determine to leave a spare host server in the "spare" state if the priority of other host servers to be replaced is below a certain threshold.

Figure 6:
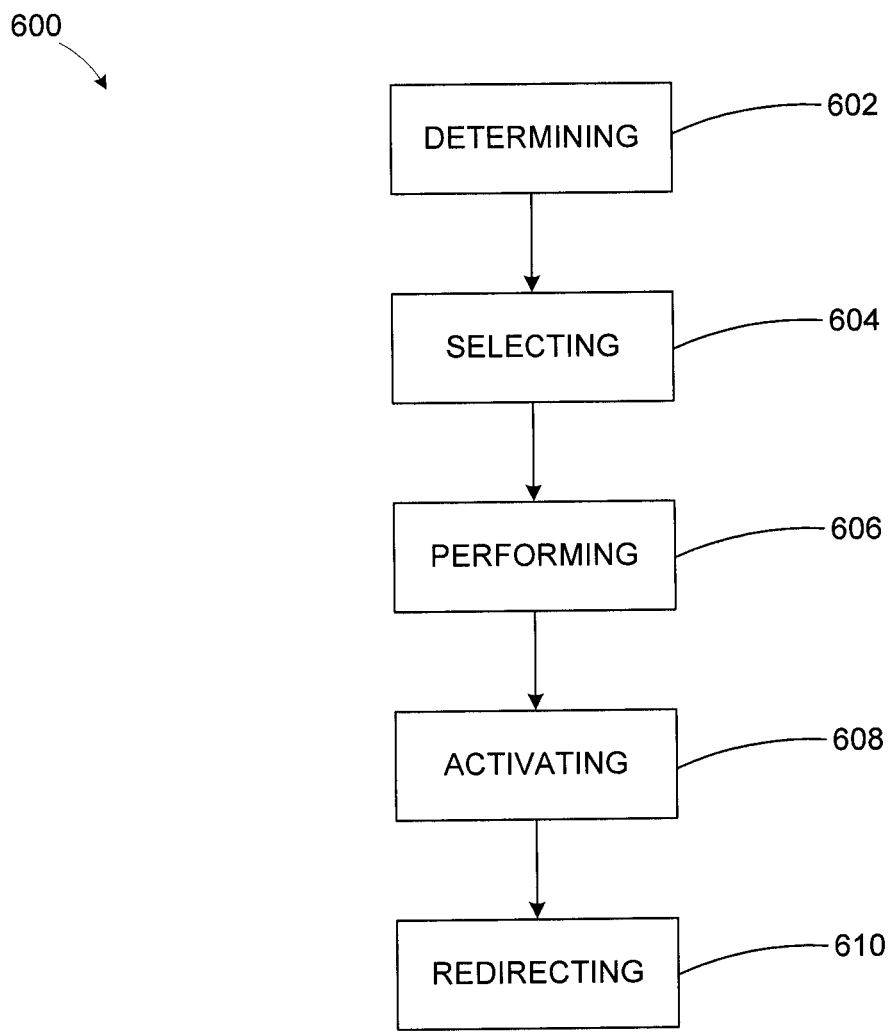
FIG. 6 is an example of a method of updating a group of host servers in a service tier.

Referring now to FIG. 6, therein is shown an example of a method 600 of updating a group of host servers in a service tier. The method 600 includes a step 602 of determining a maintenance update for a data service tier based on a service condition of a data service of a target host server. In one embodiment, this determination can include determining a priority of the maintenance update and comparing the priority of the maintenance update against priority of any other host server's need for other updates. Then, the maintenance update is determined if it has the highest priority amongst the servers in the service tier. In other embodiments, the maintenance update can be determined as long as the target host server has an outdated index data, outdated executable, an outdated kernel, or is in need of repair.

In order to execute the maintenance activity, a replacement for the service provided by the target host server has to be found. Hence following the step 602, the method 600 continues with a step 604 of selecting a spare host server to perform the maintenance update of the data service tier. Following the step 604, the method 600 includes a step 606 of performing the maintenance update of the data service tier to the spare host server. The method 600 further includes activating the data service on the spare host server in a step 608. The steps 602, 604, 606, and 608 can be executed by the updater module 322 of the maintenance system 302 of FIG. 2. The method 600 follows with a step 610 of redirecting client request traffic to the spare host server running the data service. The step 610 can be initiated by the updater module 322 and executed by the aggregator server 122 of FIG. 1.

Figure 7:
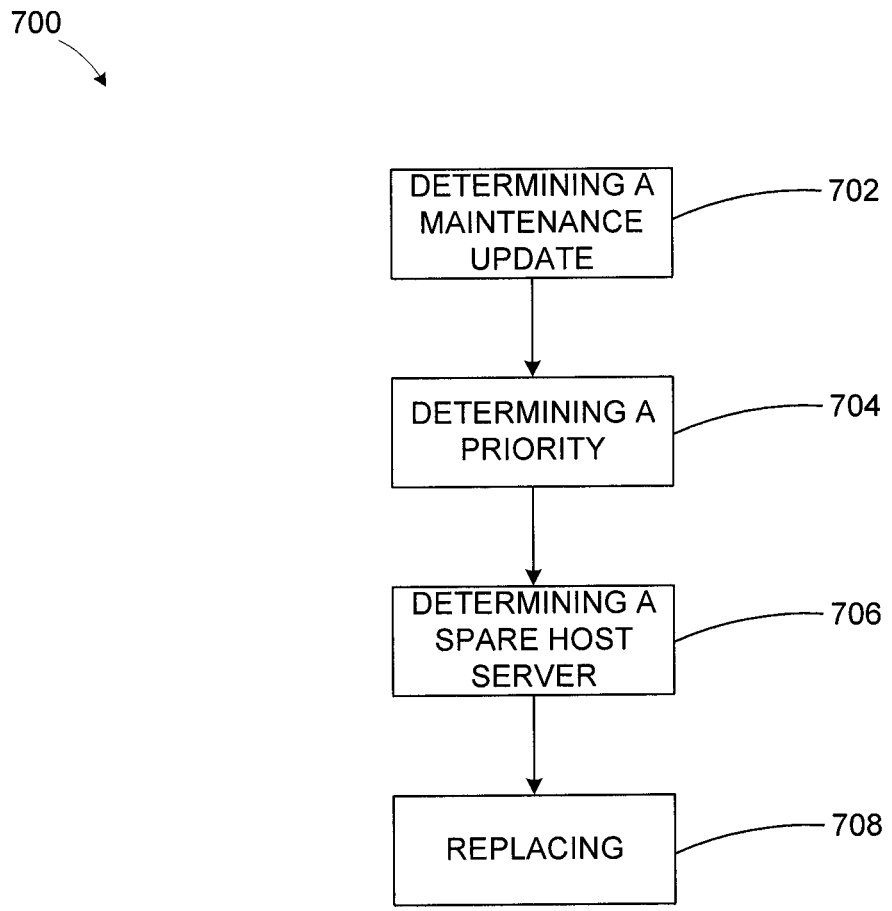
FIG. 7 is an example of a method of updating a group of host servers in multiple service tiers.

Referring now to FIG. 7, therein is shown an example of a method 700 of updating a group of host servers in multiple service tiers. The method 700 includes a step 702 of determining a maintenance update to a data service provided by a target host server in a service tier based on a service condition of the target host server. In this example, different service tiers share one or more spare servers, and hence each service tier must compete for priority use of the spare servers. Hence following the step 702, the method 700 continues with a step 704 of determining a priority of the maintenance update based on an operating state of the target host server. Following the step 704, the method 700 includes a step 706 of determining a spare host server for replacing the data service of the target host server in response to approval of the priority of the maintenance update. The approval of the priority is determined when the priority is higher than any other maintenance update that petitions for use of the spare host server. Following the step 708, the method 700 includes a step 710 of replacing the data service of target host server with the spare host server. The steps 702, 704, 706, and 710 can be executed by the updater module 322 of the maintenance system 302 of FIG. 3.

Figure 8:
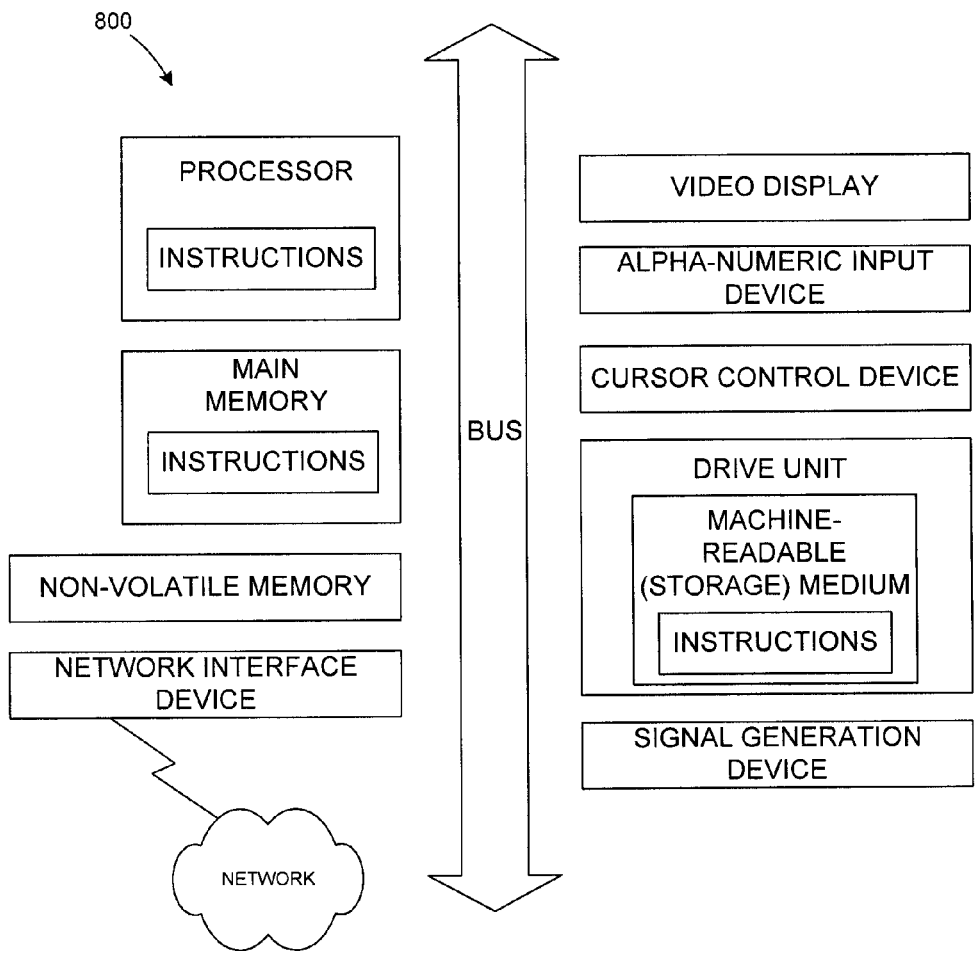
FIG. 8 is a diagrammatic representation of a machine in the example form of a computer system within which a set of instructions, for causing the machine to perform any one or more of the methodologies or modules discussed herein, may be executed.

Referring now to FIG. 8, therein is shown a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIGS. 1-3 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. §112, 116 will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, performed by a computing device, comprising:
    determining, by the computer device, that a maintenance update is needed for an existing data service of a data service tier running on a target host server based on a service condition of the existing data service, wherein said determining includes comparing an available index shard update from an external server to a current index shard of the existing data service running on the target host server;
    selecting, by the computer device, a spare host server to perform the determined maintenance update, wherein said selecting includes determining a priority of the determined maintenance update based on a characteristic of the current index shard of the existing data service running on the target host server and petitioning for an idling host server without an assigned service tier;
    performing, by the computer device, the maintenance update of the data service tier to the spare host server to prepare a new data service running on the spare host server, wherein the new data service utilizes an index shard consistent with the available index shard update from the external server;
    activating, by the computer device, the new data service on the spare host server;
    redirecting, by the computer device, client request traffic for the existing data service to the spare host server to replace the existing data service of the target host server; and
    deactivating, by the computer device, the existing data service of the target host server after the client request traffic is redirected to the spare host server thereby causing the new data service of the spare host server to replace the existing data service of the target host server.

2. The method of claim 1, wherein the data service tier is an indexing service that maintains an index table of stored content for a website and wherein determining the maintenance update is needed includes determining an age of the index table relative to the available index shard update.

3. The method of claim 1, wherein determining the maintenance update is needed further includes comparing a first version age of an executable program used to provide the existing data service to a second version age of an up-to-date executable available in the external server.

4. The method of claim 1, wherein performing the maintenance update includes replacing the current index shard with a processed index shard, wherein the processed index shard uses a more compact data format than the current index shard.

5. The method of claim 1, wherein determining the maintenance update includes determining that the target host server has failed an error check.

6. The method of claim 1, wherein determining the maintenance update includes determining that the target host server is non-responsive.

7. The method of claim 1, wherein selecting the spare host server includes determining the spare host server based on network bandwidth available to the spare host server.

8. The method of claim 1, wherein selecting the spare host server includes selecting the spare host server from an idling host server within the data service tier.

9. A method, performed by a computing device, comprising:
    determining, by the computing device, a maintenance update to a data service provided by a target host server in a service tier is needed based on at least a current version of an index shard of the data service;
    determining, by the computing device, a priority of the maintenance update, wherein the priority is determined based on a characteristic of the current version of the index shard running on the target host server, and wherein said determining the priority includes comparing the current version of the index shard against that of one or more other servers, wherein the other servers respectively run data service instances that require one or more maintenance updates, wherein determining the priority further includes increasing the priority of the maintenance update when both the service tier and a replica of the service tier in a same physical region have an outdated index shard;

petitioning, by the computing device, for replacement of the target host server based on the determined priority of the maintenance update;

identifying, by the computing device, a spare host server for replacing the data service associated with the maintenance update in response to approval of the priority of the maintenance update, wherein the spare host server has not previously been assigned to the service tier; and replacing, by the computing device, the data service of target host server with an up-to-date data service provided by the spare host server, wherein the up-to-date data service references a most up-to-date version of the index shard available to the service tier.

10. The method of claim 9, further comprising in response to the target host server being replaced by the spare host server, marking the target host server as a potential spare server.

11. The method of claim 9, wherein replacing the data service includes uploading an index shard update for the data service to the spare host server, in response to identifying the spare host server, wherein the index shard update corresponds to the most up-to-date version of the index shard.

12. The method of claim 9, wherein replacing the data service includes uploading a service binary for the data service to the spare host server, in response to identifying the spare host server.

13. The method of claim 9, wherein approval of the priority is determined by the priority of the maintenance update being higher than priority of any other maintenance update petitioning to use the spare host server.

14. The method of claim 9, wherein identifying the spare host server includes determining the spare host server from host servers in same server rack as the target host server.

15. The method of claim 9, further comprising updating the spare host server to join the service tier of the target host server in response to identifying the spare host server for replacing the data service.

16. A maintenance system, comprising:
a host server including a processor and a non-transitory storage medium having an updater module executable by the processor;
wherein the updater module is configured to:

determine a maintenance update for a data service tier of an existing data service running on a target host server by comparing an existing version of a component of the existing data service against an up-to-date version of the component on a maintenance server system, wherein the component is an index shard;

determine a priority of the maintenance update based at least partly on a characteristic of the existing version;

select a spare host server to perform the determined maintenance update of the data service tier based on the up-to-date version from the maintenance server system and thereby enabling the spare host server to provide a replacement data service that replaces the existing data service running on the target host server, wherein the spare host server is selected by determining a priority of the maintenance update based on a characteristic of the current index shard of the existing data service running on the target host server and petitioning for an idling host server without an assigned service tier;

activate the replacement data service on the spare host server; and deactivate the data service on the target host server; and an aggregator server is configured to direct client request traffic to the spare host server when the data service is deactivated on the target host server.

17. The method of claim 1, wherein deactivating the data service of the target host server causes the target host server to be marked as a next spare host server; and the method further comprising:

determining a next maintenance update to a data service of another target host server;

performing a maintenance update of the data service tier to the target host server acting as the next spare host server; and replacing the data service of the other target host server utilizing the target host server acting as the next spare host server.

18. The method of claim 1, further comprising maintaining, in the data service tier, a set number of one or more spare host servers between each data service replacement, wherein whenever a data service of an existing spare host server is activated, a data service of another host server is deactivated.

19. The method of claim 9, wherein each of the one or more other servers has a different version of a data service in the same service tier.

* * * * *